United States Patent [19]

Mosser

[11] Patent Number: 4,889,558

[45] Date of Patent: Dec. 26, 1989

[54] COATING COMPOSITIONS CONTAINING UNDISSOLVED HEXAVALENT CHROMIUM SALT

[75] Inventor: Mark F. Mosser, Sellersville, Pa.

[73] Assignee: Sermatech International, Inc., Limerick, Pa.

[21] Appl. No.: 777,228

[22] Filed: Sep. 18, 1985

Related U.S. Application Data

[63] Continuation-in-part of Ser. No. 555,477, Nov. 28, 1983, abandoned.

[51] Int. Cl.$^4$ ................................................ C04B 9/02
[52] U.S. Cl. .................................... 106/14.12; 75/234; 106/1.12; 106/1.22; 106/14.21; 106/286.5; 428/457
[58] Field of Search ........................ 106/14.12, 14.21; 148/6.16, 1.12, 1.16, 1.17

[56] References Cited

U.S. PATENT DOCUMENTS

| | | | |
|---|---|---|---|
| 2,902,390 | 9/1959 | Bell | 148/6.2 |
| 3,049,441 | 6/1963 | Curtin | 148/6.16 |
| 3,248,249 | 4/1966 | Collins | 106/286 |
| 3,248,251 | 4/1966 | Allen | 106/286.2 |
| 3,869,293 | 3/1975 | Brumbaugh | 106/14 |

*Primary Examiner*—A. Lionel Clingman
*Assistant Examiner*—John F. McNally
*Attorney, Agent, or Firm*—Weiser & Stapler

[57] ABSTRACT

A coating composition for providing a part with improved salt spray resistance, which comprises undissolved solid hexavalent chromate in an aqueous acid solution which is the reaction product of phosphate ions with ions of the group consisting of chromate or molybdate ions, and their coatings and coated parts.

18 Claims, No Drawings

COATING COMPOSITIONS CONTAINING UNDISSOLVED HEXAVALENT CHROMIUM SALT

This Application is a continuation-in-part application of application Ser. No. 555,477 filed Nov. 28, 1983, now abandoned.

The present invention relates to coating compositions for coating metal parts so as to improve their corrosion resistance to atmospheric and other environmental conditions to which they are exposed. The invention further relates to coating compositions which will form a primer coating so as to improve the adhesion between a metal part and a top coating.

The invention also relates to the metal parts coated with such compositions and to a method for coating metal parts. More particularly, the invention relates to aqueous coating compositions containing a dissolved chromium compound or phosphate and chromium or molybdenum compound and particles of leachable chromate pigments.

Coating compositions are known which consists essentially of a slurry of solid inorganic particulate material in an aqueous acidic solution containing substantial amounts of dissolved metal, chromate, dichromate, or molybdate and phosphate. After application of such coating to a substrate, it is heated to a temperature of about 500° F. until the coating is water insoluble. Such coatings usually incorporate therein metal powders, such as aluminum powder, as the solid particulate material so as to provide a sacrificial corrosive protection. That is, where, for example, the substrate for the coating is ferrous metal, the aluminum powder in the coating, by way of electrode chemical reactions which ensue in a salt-spray or other corrosive atmosphere, generally sacrifices itself to the end that there is little or no corrosion of the ferrous metal substrate. It has further been established, that this property of the sacrificiality of the coating in providing the increased corrosion protection is greatly enhanced by so processing the coating as to render it electrically conductive. Usually, the aluminum filled coatings are made sacrificial and galvanically active by either cold working (burnishing) the coating surface, or by heat treating to a temperature of about 1000° F. for ninety minutes. Other heat treatments can be used. The goal being to produce an electrically conductive aluminum coating that is sacrificial, i.e. will corrode and protect the adjacent base metal areas from corrosion.

Sacrificial, burnished or heat treated coatings of this type are commonly used on jet engine compressor hardware. In other applications burnished or heat treated coatings may be used in salt environments and/or in elevated temperatures. In salt environments, particularly when coupled with elevated temperatures, the galvanic activity of the coatings produce white corrosion products or gelatinous masses of aluminum hydroxide and other products. In many applications, these white products or "white rust" are as undesirable as normal rust.

Other techniques and compositions have been proposed in addition to what has been discussed above for producing corrosion resistant and protective coatings on metal substrates. U.S. Pat. No. 3,713,904 to Bernath et al discloses a coating composition containing an organic resin. Bernath points out that the novelty of his organic resinous coating is that it always contains trivalent chromium salts which comes about from the complete reduction of all of the hexavalent chromium salts to trivalent chromium salts (hereafter all chromium salts shall be referred to as trivalent or hexavalent chromium). The ultimate objective of Bernath is an adherent conversion coating on a metal substrate which is an organic resin coating. Bernath's work is based primarily on the fact that the reactants include a solvent with a variety of synthetic resins such as epoxies, alkyds, organosols etc, all reactants being in a predetermined ratio. No more chemicals are added than are necessary for the completion of the reaction and the formation of the conversion coating. The conversion coating by definition is bonded during the bake period by causing a chemical conversion bond between the substrate and the coating as disclosed by Bernath. This occurs in Bernath's coating by the trivalent chromium which had been produced at an earlier stage. The coating is oxidized by heat (or other means) to produce hexavalent chromium to which the bonding to the metal base is attributable.

It is essential for Bernath's coating composition that the organic liquid coating composition which contains resin, also contain hexavalent chromate on dichromate and sufficient oxidizable material to reduce completely the hexavalent chromium to trivalent chromium compounds. This is a fundamental distinction over the prior art which Bernath points out. That is, in the prior art, a specified proportion of hexavalent chromium must always remain if satisfactory results were to be obtained. Bernath states that for reasons which he has not yet found adequate explanation, the hexavalent chromium ion which is initially present, must be reduced by an oxidizable component in the liquid coating mixture, to the trivalent state. After reaction of the hexavalent chromium with the oxidizable component to trivalent chromium, the resulting liquid organic mixture which contains also inorganic components, is identifiable by the total absence of detectable hexavalent chromium.

In accordance with Bernath's teaching, the liquid coating composition is also constituted by an organic primer composition which may contain the organic resins, such as the epoxy resins or a solvent, such as an alcohol.

The absence of hexavalent chromium as a result of the reduction to trivalent chromium is readily identifiable by the change of color from the yellow-orange color of the hexavalent chromium to the green color characteristic of trivalent chromium. This is evident from the examples of Bernath. The reduction reaction is exothermic.

It is critical that the components of Bernath's liquid composition include an oxidizable component in sufficient amounts to reduce all of the $Cr^{+6}$ to $Cr^{+3}$ so that the final liquid mixture is characterized by the total absence of chromium in the +6 state, all of the chromium being in the +3 state. In accordance with Bernath, the oxidizable component may be in one of two forms; either it is an integral part of the reactive resin, or it may be added in the form of a organic compound or reagent which is capable of reducing the chromium to the +3 state. Bernath illustrates the type of resins which are capable of the reduction of the hexavalent chromium to trivalent chromium. He also illustrates the type of organic solvents (primarily alcohols and aldehydes) such as Carbitol, Isophorone and other oxidizable solvents which are reactive enough to reduce the hexavalent chromium to trivalent chromium; after the reduction a gel is produced.

It is an objective of Bernath to fully first reduce the hexavalent chromium to trivalent chromium. This is illustrated by his attempts to accomplish the same results by adding trivalent chromate directly to the mixture without the necessity of first reducing the hexavalent chromate to the trivalent state, which results he reports were quite unsatisfactory in every case.

Thus the Bernath liquid composition before application to the substrate and baking is characterized in that the hexavalent chromium is in solution completely and reduced to trivalent chromium. The medium is primarily an organic medium either because of the resin or the organic solvent. The change in color as a result of the reduction of the chromate is characteristic of this product. When, as Bernath shows, he obtains a gelled product, this also is a consequence of the reduction of the chromate. The chemical bonding with the substrate is formed when the trivalent chromium is reoxidized; the chemical bonding being due, at least in part, to the hexavalent chromium which is formed if a tenacious and appropriate bond is to be formed with the substrate. Any other resins such as polyvinylidene fluoride, which may be added to the coating composition, is only added in combination with one of the reactive resins, that is, those that will be the oxidizable component or in conjunction with the oxidizable alcohols.

It is evident also from the study of the Bernath patent that there is no use of molybdate ions.

This description of the Bernath patent highlights the distinctions over the present invention as will be made even clearer hereinafter. The Bernath disclosure is incorporated herein by reference.

U.S. Pat. No. 3,272,663 to Kronstein discloses a film forming coating composition which when applied to a metal surface, reacts with the metal to form an adherent integral complex surface coating. The coating composition contains a reactive resin such as polyvinyl butyral and a molybdenum and/or a chromium compound in the form of a pigment-resin dispersion and is combined with an organic solvent and a minor amount of water. An activator which is constituted by a small amount of water, and which provides phosphate ions to the coating composition, is added to the pigment-resin dispersion. Ethanol is preferably added to the activator to enhance the miscibility of the activator and the pigment-resin dispersion. All of the chromate and/or molybdate compound of the dispersion is combined with the activator. After the surface reaction of the coating composition with the metal substrate, the solvent is removed to form a water-insoluble film. Heat curing of the composition is not required.

Accordingly, the compositions of Kronstein are constituted by a dispersion of a pigment-resin in an organic solvent which may contain a minor quantity of water relative to the liquid vehicle of the pigment-resin dispersion. The ratio of water to organic solvent for the resin is low enough to avoid precipitation of the dispersed organic resin and destroying its film forming capacity. It appears from the teachings of Kronstein that the proportion of water in the predominantly organic solvent never exceeds approximately 5%.

The Kronstein patent is herein incorporated by reference.

The present invention is described in further details below herein. The following description of what inherently occurs or is present in the coating compositions of the invention are set forth for the purpose of contrasting and distinguishing over the above described prior art. In the present invention, the liquid coating composition is virtually and essentially exclusively aqueous. It is not an organic solution although the aqueous solution may contain optionally some resins in dispersion. The coating is primarily an inorganic coating, i.e. the essential components are inorganic.

Of primary importance is that the aqueous solution contains two types of chromates, a first chromate which is an essential constituent of what is called the binder component of the aqueous composition and a second chromate which is not so reacted, and which is further described herein. The first chromate dissolves along with the phosphate ions of the binder. The binder is thus constituted of the phosphate ions such as in the form magnesium phosphate, and dichromate ions such as in the form of magnesium dichromate. The solution is a transluscent acidic aqueous solution typically as is disclosed in prior art in particular the below referred to Allen patent.

The other chromate component of the aqueous coating composition of the invention is chromate such as strontium chromate (or other chromates as are disclosed further below in the specification or equivalents thereof). An essential feature of that chromate is that in accordance with the invention, it is consistently in the hexavalent form but not dissolved. There is no change of valency of this chromate even after the coating is applied and cured on the metal substrate. Moreover, it is a characteristic of the aqueous coating composition of the invention that the quantity of hexavalent chromate is such as to be in excess of its solubility in the aqueous acidic phosphate/chromate (or molybdate) binder. Thus it is a characteristic feature of the aqueous composition for coating of the invention that there is present hexavalent chromium in such excess that the chromate is insoluble and settles in the bottom of the aqueous composition. At no stage of the reaction of the components of the binder of the invention and the addition of the hexavalent chromium compound, is the composition a gel as a result of the reduction of the chromium. The compositions of the invention may even exhibit a high viscosity as a result of high solid content but not as a result of the reduction of the chromate. Also, as is discussed below, certain compositions' viscosity may be increased by the optional addition of a specific agent which renders the composition of the invention thixotropic, i.e. liquid when subject to movement and gel-like, when not subject to movement.

Unlike the prior art, the aqueous coating composition used in the invention thus is constituted by a liquid phase, (the binder) which is constituted by the phosphate and molybdate or chromate reactants, and the second phase, a solid undissolved phase, that is the hexavalent chromium salt, such as strontium chromate. It is therefore also a characteristic of the aqueous composition of the invention that it does not show a change of color (such as is, for instance, disclosed by Bernath) from the yellow-orange color typical of hexavalent chromium ions to a green color characteristic of a liquid only containing trivalent chromium ions.

If any chromate is dissolved in the composition it will also remain primarily in the hexavalent state. It is to be however, understood that the presence of transition metal ions in the solution or reaction with the added pigment materials (e.g. aluminum) may mask or otherwise modify the appearance of the solution as colored yellow or orange due to dichromate ions to, for instance brown. However, regardless of apparent color, the solution will consistently test positive for the presence of chromium in the hexavalent state, not infrequently essentially all or virtually all in the hexavalent state.

The phosphate and chromate (or molybdate) constituents of the binder are often reacted by an acid-base reaction, as is known. That composition is free of any oxidizable components which could reduce any, i.e. virtually all or all of the chromate present, i.e. to the extent of not testing positive for the presence of hexavalent chromium ions.

The composition is also free of any reactive resins or other components such as alcohols, which could react with the hexavalent chromium to reduce it completely to trivalent chromium.

Unlike the Bernath patent, there is in the liquid composition (as well as in the final coating) excess undissolved and unreacted hexavalent chromium present which is available and does leach out of the coating after application to the substrate and a thermal cure.

In the process of making the liquid aqueous composition of the invention, the components of the binder may be first reacted and then the hexavalent chromium added to the acid based reacted binder. Alternatively, as is disclosed further below, the hexavalent chromium will be added in such excess as to provide and remain undissolved in the hexavalent state after a necessary amount has been reacted with the phosphate ion. The final aqueous composition is therefore constituted by the dichromate present in the binder with the phosphate and in addition the hexavalent chromate often in its preferred form as strontium chromate, which is the undissolved component. That chromate is often also designated as the "pigment". That chromate is not reduced or dissolved and remains in the hexavalent state throughout, as was discussed above.

In the heating process the binder chromate and phosphate forms a glassy-like phase which holds the coating together. The additional chromate in the form of undissolved chromate pigment, remains as chromate even at elevated temperature and is not reduced or reacted. This is an essential feature of the invention for that chromate (such as strontium chromate) is therefore unreacted throughout the preparation of the coating composition and even after curing it remains therefore available for leaching gradually out of the coating and to bring about its beneficial effect.

An unexpected aspect of the invention is the presence of two chromates, each one playing a different function and as a result bringing about the beneficial advantages in the final coating.

Unexpectedly therefore, in accordance with the invention, the traditional white corrosion by-products "white rust" which is formed by corrosion or sacrificial action on the coated substrate is eliminated. Thus, the coating is free of the unsightly corrosion by-products on its surface. There results therefore a coating which even though exposed to corrosive and other elements of the environment, remains free of the corrosion products. While the principle by which the invention works is not yet fully understood, the following may be suggested. When the composition of the invention contains aluminum or other similar metal particles, these will tend to be sacrificed upon exposure to elevated temperature and/or to salt solution. These products are likely to contain aluminum hydroxides and other salts forming on the surface of the substrate as a gelatinous or powder like by-product, which is unsightly and consumes the sacrificial metal. The leachable chromate (hexavalent chromium compound in accordance with the invention, contributes to virtually eliminating completely the formation of these white reaction products.

Surprisingly, however, the presence of such hexavalent chromium which is then leachable out of the coating as it is exposed to the above-mentioned environmental conditions, lengthens the useful life of the coating not only because it may react with any by-products of the aluminum but because it apparently also inhibits the formation of such by-products. In a sense, the hexavalent chromium in accordance with the invention provide a useful reservoir for either inhibiting the side-effects of the sacrificial aluminum particles and/or substantially contributing to eliminating the by-products of the aluminum reaction. Further details regarding the invention are apparent from the description herein.

Accordingly, it is an objective of the present invention to provide a means for eliminating all white corrosion products without interfering with the sacrificial action of the coating or adversely affecting any of the other coating characteristics.

It is a further object of the invention to provide a coating for metal parts which has improved humidity resistance and salt spray resistance.

It is a yet still further object of the invention to provide an improved coating composition which can be applied to parts by spraying, dipping or other methods of operation.

According to the present invention, there is now provided a means for improving salt spray resistance of water insoluble coatings formed from an aqueous acid binder solution which comprises ions of at least one of the group which is phosphate, chromate, dichromate, and molybdate through the use of leachable chromate pigments.

Broadly, one embodiment of the present invention is directed to an aqueous acidic coating composition for application, and cuing on a metal substrate. Accordingly, there is prepared an adherent, water insoluble corrosion resistant coating on the substrate, which comprises an intimate mixture in an aqueous liquid medium of (a) substantial amounts of phosphate ion and ions selected from the group consisting of chromate and molybdate; and (b) particles of a leachable chromate pigment.

The phosphate can be introduced into the solution in the form of phosphoric acid, in the form of phosphates of the metal or metals to be included as the metal cation, or as is preferred, it can be added in both forms. It will be understood that the term "phosphate" is intended to comprehend not only the $PO_4$ ion, but also the $HPO_4$ and $H_2PO_4$ ions.

It is known that phosphate and chromate/phosphate coatings are useful to protect metal surfaces. It is also known to incorporate in such coatings metal powders. For instance, Kirk and Othmer, Eds., *Encylcopedia of Chemical Technology*, 2nd ed. vol. 18, Interscience Publishers, a division of John Wiley & Sons, Inc., 1969 (pages 292–303), describes phosphate and chromate coatings. The United States patent literature describes coating solutions or dispersions for protective coating of metals, which compositions are suitable for use as components of the compositions of the invention. Such suitable compositions are disclosed by Allen (No. 3,248,251); Brumbaugh (No. 3,869,293); Collins (No. 3,248,249); Wydra (No. 3,857,717); Boies (No.

3,081,146); Romig (No. 2,245,609); Helwig (No. 3,967,984); Bennetch (No. 3,443,977); Hirst (No. 3,562,011) and others. These disclosures are incorporated herein by reference. Other illustrative patents or literature showing corrosion inhibiting and protective coating compositions of phosphates, mixtures of phosphates and chromates and/or molybdates are known to one skilled in the art and further examples need not be supplied.

According to the present invention there is provided a coating composition which has enhanced salt spray resistance, that can be applied to different varieties of substrates and which can be applied by any of the methods of spraying, dipping, brushing, etc. The coating composition comprises (a) an aqueous acid coating solution comprising phosphate ions and ions of the group of chromate ions and/or molybdate ion, and (b) about 1 to about 20% by weight of particulates of a leachable chromate pigment based on weight of other solids in the solution, preferably, 1 to 10% by weight of leachable chromate salt or pigment based on weight of other solids. When the amount of the leachable pigment is below this range . the beneficial effect of the presence is hardly noticed. Utilizing larger amounts though more costly and may cause some difficulty in uniformly applying the composition are often justified because of the important advantages derived from such higher amounts.

Compositions containing larger amounts of undissolved and leachable chromate such as to about 70 or 80% by weight of total solids are useable. Whenever it appears desirable to use other metal pigments like aluminum, lower amounts of chromate are quite satisfactory as in the range of about 30 to about 50%, e.g. about 30%.

In accordance with a preferred embodiment of the invention, a coating is formed by employing a chromate/phosphate solution in which the leachable undissolved chromate salts are dispersed therein and this solution is heat cured to a substantially water-insoluble state whereby the leachable chromate pigments are bonded therein.

The combination of compounds in said above-mentioned solution (a) is such as will provide at least 0.1 mole per liter of dissolved phosphate (preferably 0.5 mole per liter), and at least 0.2 mole per liter of a compound from the group consisting of chromate and molybdate.

In the phosphate solution it is not necessary that a metal ion be added. When the phosphate and/or chromate or molybdate ion is furnished to the solution by addition of a metal salt, as is often done, metal ion is inherently supplied to the solution. Hence, any of the known phosphates, chromates dichromates or molybdates can be used as the source of metal ion. Additionally, as is known, metal ion can be supplied in a form such as metal oxide, hydroxide, carbonate, etc. which will dissolve in acid, i.e. phosphoric acid, chromic acid or molybdic acid, to produce the metal phosphate, chromate or molybdate, and therefore the metal ion plus water and/or gas which is evolved. The following metal compounds will illustrate those which can be added to generate the metal ion within the solution, by an acid-base reaction, in accordance with the above: magnesium oxide; magnesium hydroxide; zinc oxide; zinc hydroxide; aluminum hydroxide; lithium oxide; lithium carbonate; and calcium hydroxide. Metal compounds which may be added to generate the metal ion in solution are various oxides, hydroxide or carbonates of magnesium, zinc, aluminum or others. Such procedures and sources for the metal ions are known and reference may be made to the cited '251 Allen patent, for instance, column 7, lines 26–57, which is incorporated herein by reference.

The pH of the aqueous binder used herein is preferably, but not necessarily, in the range of about 0 to about 3.0, preferably in the range of about 1.5 to about 2.5.

If it is desired to prepare coating compositions which are especially well-suited for dip/spin, or application by dipping, the compositions may, optionally, contain certain amorphous silicas and a non-ionic surfactant, which causes the composition to be thixotropic. Such suitable additives (and the resulting compositions) are described in copending application Ser. No. 06/441,754, filed Nov. 15, 1982, now U.S. Pat. No. 4,548,646, granted on Oct. 22, 1985, which is incorporated herein by reference. Likewise, the compositions of the invention may be made thixotropic by incorporation of certain aluminas as disclosed in copending application Ser. No. 06/485,748, filed Apr. 18, 1983 now U.S. Pat. No. 4,554,408, granted on Oct. 1, 1985, which is incorporated herein by reference.

The compositions of this invention may, therefore, incorporate an acid-stable, non-colloidal amorphous silica and a non-ionic surfactant. Preferred is fumed silica, silica gel and precipitated silica. The viscosity generally ranges from about 600 to 45,000 cp. The pH will generally range from about 0.5 to 3.0. Where the composition comprises a dispersible hydrated alumina having a boehmite type crystal lattice, the viscosity is generally in the range of about 800 to about 50,000 cp. The pH generally ranges from about 1.5 to about 3.0.

It is a noteworthy aspect that by virtue of the ingredients of the compositions of the invention, the compounds which cause thixotropy (in accordance with the two above-referred to patent applications) can be used in a smaller amount and still cause the necessary thixotropy. For instance, an amount of silica of 0.1 to 3 percent by weight based on total solids may be used. In conjunction therewith, an acid-stable non-ionic surfactant in an amount of 0.005 to 0.1 percent by weight based on total solids may be used. Likewise, when it is desired to use a fumed alumina, less than 0.25% by weight such as 0.1% by weight may be used. It is understood, however, that the parameters of the ingredients disclosed in the above-referred to patent applications are quite applicable herein, but that these ingredients are usable in smaller proportions (or in the lower ranges) disclosed therein by virtue of the effect of the small size pigment particles added in accordance with this invention.

On the coatings of the invention (at any stage prior to and including after rendering the coating sacrificial), there may be applied one or more layers of a coating of the invention, or of a conventional coating. Such top coatings are disclosed in the art. Such top coatings can be one of the above-described binders (without the aluminum), may have surfactants or other modifiers of the surface tension, including a fluorocarbon surfactant, cellosolve acetate, fumed silica, hypophosphites or other additives. The top coatings may also be those which are commonly applied by plasma spraying or electrodepositing.

Among the suitable leachable chromate salts are strontium chromate and the zinc chromates. The zinc chromates include zinc yellow, zinc tetroxy chromate, zinc potassium chromate, zinc chromate, and the like.

It has been found, that addition of leachable strontium chromate and/or zinc chromates to the coatings eliminates all white corrosion products without interfering with the sacrificial action of the coating or adversely affecting any of the other coating characteristics. Additionally, the presence of the leachable chromates provides humidity resistance and improved salt-spray resistance.

Surprisingly, despite the fact that the acid binder when cured forms an insoluble state, the chromate salts remain leachable. Also, upon leaching, the integrity of the coating film is not destroyed.

In addition, the present invention relates to a coated metal substrate, and the preparation of such a substrate exhibiting the above described adherent and corrosion resistant coatings.

The metal substrates contemplated by the present invention are exemplified by the metal substrates to which a phosphate/chromate acid solution may or can be applied for enhancing corrosion resistance of such substrate metals. For example, such metal substrates include aluminum and aluminum alloys, steel, stainless steel, ferrous zinc, cadmium, powder metallurgy parts and the like.

It is noteworthy that in accordance with the invention, a greater latitude is provided in the type of chromate/phosphate compositions which can be used. For instance, with respect to the Allen Pat. No. 3,248,251, it is not necessary that the acid binder be confined to the various concentrations and other molar relationships disclosed by that patent. The present invention, therefore, allows for the use of a large number of and a great variety of acid binder solutions for making the coating compositions.

It is preferred to maintain the chromate/phosphate ratio constant so as to improve formability. It is also preferable to have the metal ion concentrations low to improve curing at lower temperatures. In the composition the preferred metal ion is magnesium, however, zinc and aluminum ions as well as other ions can also be utilized.

Before starting the treatment of the present invention it is, in most cases, advisable to remove foreign matter from the metal surface by thoroughly cleaning and degreasing. Degreasing may be accomplished with known agents, for instance, with agents containing sodium metasilicate, caustic soda, carbon tetrachloride, trichloroethylene, and the like.

Commercial alkaline cleaning compositions which combine washing and mild abrasive treatments can be employed for cleaning, e.g. an aqueous trisodium phosphate-sodium hydroxide cleaning solution. In addition to cleaning, the substrate may undergo cleaning plus etching or grit blasting.

After the coating composition has been prepared and thoroughly mixed, it can be applied to a surface by using a spray, dip, dip/spin, knife or flow coating technique depending upon the viscosity of the dispersion, solution or slurry. After the primer composition has been applied to a substrate by any of the above techniques, it is fused into a continuous adherent film by heating. Curing temperatures range between about 350° F. and about 800° F., preferably between about 450° F. and about 750° F., for example, 500° F. to 520° F. for a period of from about a few seconds to about 2 hours, preferably for a period from about a few seconds to about 2 hours for examples containing resin primers. Metal filled coatings are usually cured for 30 to 60 minutes at 600 to 700° F. Generally, the higher the cure temperature, the shorter the residence period of the coating composition at that temperature.

In accordance with the invention, the coating composition of the invention comprises, in addition to the undissolved, unreacted, solid hexavalent chromium compound and acid binder which comprises the reaction product of phosphate ions and ions of the group of chromate or molybdate ions, metal particles dispersed therein. Most preferably the metal is aluminum or its alloys. Atomized aluminum powder is suitable. So are aluminum flakes. However, any combination of metals may be utilized depending upon the requirements.

For many applications, aluminum particles, e.g. atomized particles, having an average equivalent spherical diameter of 5 to 10 microns is quite satisfactory. For special applications where further improved performance is necessary, spherical atomized aluminum powder having an average equivalent diameter less than 4 microns is preferred. Of course other than aluminum metals may also be employed.

Therefore, in accordance with the invention, there is provided the liquid acid solution (which contains the chromate/molybdate and phosphate ions), the leachable chromate salts and the particulate metallic material, which preferably is aluminum.

A preferred manner of forming the first layer of the coatings of the invention is to admix the particulate metal material and hexavalent chromium compound under vigorous mixing conditions into the acid solution.

The sequence of addition of the components of the phosphate solutions is not critical either, as is disclosed in the prior art, for instance, the Allen Pat. No. 3,248,251.

However, it is critical that the leachable pigments are not dissolved in the binder so that it is preferable to add the pigments to the binder after it is prepared and cooled.

It is understood that other particulate materials may be added to the binder prior to mixing in amounts depending on the specific characteristics desired for the layer such as graphite, refractory metal oxides, refractory or metal carbides, nitrides, silicides or borides and resins, for example, polyvinylidene fluoride.

In another aspect of the invention, the phosphate ions can in part or all be omitted from the composition. Such composition contains the dissolved chromate or dissolved molybdate and the leachable chromium and, optimally, particulate metal like aluminum. Such composition is especially suitable, but not exclusively, for thinner coatings than those which contain phosphate.

A leachable pigment is an active pigment (in contrast to a passive pigment like titanium oxide) material which protects a metallic surface from corrosion. This can occur in the presence of moisture where the metal dissolves at a predictable rate, usually low and creates a localized passivating effect on metallic pigments or substrates. Leachable chromates are able to passivate Al, Fe, Cd, Mg, Zn and other metallic substrates and/or the pigments. This in conjunction with the invention, appears an advantageous function of the chromate used herein.

Generally, the aluminum metal particles (or alloy thereof) are present in a pigment to binder solids range of 1.5 to 5.0 by weight. In other terms, this means that for 1.5 grams of aluminum present in the coating, 1.0 grams of dissolved chromate/molybdate and phosphate solids are present. At the other side of the range, a ratio of 5.0 indicates that 5 grams of aluminum particles are present for 1.0 grams of binder solids. Since the aluminum is not an essential ingredient for the composition, but an optional one, it is evident that quite a latitude with respect to these ranges is permissible.

The following examples illustrate the preparation of the coatings of the invention and are not to be considered limitations thereof.

EXAMPLE 1

A coating composition of the present invention was prepared as follows:

A. Preparation of Binder.

A binder having the following ingredients was prepared:

| Water (deionized) | 780 ml |
| --- | --- |
| Magnesium oxide | 74 g |
| Chromic acid | 90 g |
| Phosphoric acid (85%) | 373 g |

The magnesium oxide and chromic acid were admixed with water and then the phosphoric acid was added.

B. Preparation of Coating.

| Binder of Part A | 100 ml |
| --- | --- |
| Atomized aluminum powder (Average particle size (FSSS) 5.5 μm) | 82 g |
| Strontium chromate | 10 g |

The ingredients were admixed and the resulting composition was spray applied to degreased, grit blasted steel and cured at 600° F. for 40 minutes. The coating applied and cured in the manner listed will show improved resistance to atmospheric corrosion. When thermally treated at 1000° F. or burnished to produce surface conductivity, the addition of the strontium chromate does not interfere with these processes. Additionally, after either of these treatments and exposure to salt spray, no white sacrificial by-products are produced.

EXAMPLE 2

A coating composition of the type disclosed by Wydra (U.S. Pat. No. 3,857,717) was prepared as follows:

| Water (deionized) | 295 ml |
| --- | --- |
| Phosphoric acid (85%) | 87 g |
| Phosphorous acid | 42 g |
| Chromic acid | 62 g |
| Aluminum powder (Atomized 5.5 μm av. particle size) | 300 g |
| Strontium chromate | 30 g |

The phosphoric acid, phosphorous acid and chromic acid were admixed with water. To the mixture was added with stirring the aluminum powder. The mixture was cooled and the strontium chromate was added.

The resulting composition was sprayed on a clean muffler and dried at 250° F. for 30 minutes. After cooling to room temperature the muffler was coated with a conventional silicone-alkyd black high temperature coating. The coating combination was then cured at 450° F. for 15 minutes. Upon exposure to use temperature (1000° F.) for two hours followed by salt fog, the coating remained black and free from red rust and white sacrificial products after 336 hours of testing per ASTM B117 in the salt fog cabinet.

EXAMPLE 3

A coating composition of the invention was prepared by mixing the following ingredients:

| Magnesium oxide | 58.2 ml |
| --- | --- |
| Chromic acid | 286.0 g |
| Phosphoric acid (85%) | 856.3 g |
| Magnesium carbonate | 180.8 g |
| Water | 2,108.0 g |
| Spherical aluminum powder (particle size average 3.3 μm) | 3,103.5 g |

To 620 g of the mixture, 428 g of a premixed 10% boehmite dispersion was added by stirring. The dispersion was prepared as follows:

| Water | 447.0 ml |
| --- | --- |
| Hypophosphorous acid (50%) | 3.6 g |
| Dispersible boehmite alumina | 45.0 g |
| Strontium chromate | 80.0 g |

The resulting coating composition has the following characteristics:

| pH before dispersion addition | 1.6 |
| --- | --- |
| Viscosity before dispersion addition | 1285 cp |
| pH after dispersion addition | 2.2 |
| Viscosity after dispersion addition | 2450 cp |

Steel parts such as screws and fasteners were coated with the composition using the dip/spin method. The coating was dried at 175° F. and then cured at 650° F. To make the coating electrically conductive, the cured parts were burnished in a blaster using aluminum oxide grit (or glass beads at low pressure). The coated parts had excellent resistance to standard salt spray and corrosion tests and no white corrosion products were visible after 336 hours of salt spray testing.

EXAMPLE 4

A coating composition was prepared by mixing the following ingredients:

| Water (deionized) | 380 ml |
| --- | --- |
| Copper chromite black spinel pigment | 100 g |
| Fumed silica (Cabosil M-5) | 12 g |

The mixture was blended for 5 minutes, then the following were added:

| 10% Nonionic surfactant in deionized water | 10 ml |
| --- | --- |
| Strontium chromate | 9 g |

The composition was spray applied over an aluminum powder filled chromate/phosphate composition and cured at 700° F. for 10 minutes. The black coating eliminated white corrosion products.

EXAMPLE 5

A coating composition was prepared as follows utilizing the binder of Example 1:

| | |
|---|---|
| Binder from Example 1 | 100 ml |
| Distilled water | 100 ml |
| Aluminum powder, (−325 mesh, average particle size 5 μm) | 160 g |
| Strontium chromate | 10 g |
| Nonionic surfactant (Triton X-100) | 1 ml |

The resulting coating was applied over carbon steel panels that have been degreased. After spray application, the coating was cured at 550° F. for 15 minutes. After cooling, the coating was topcoated with an electrostatically applied epoxy powder coating and cured. This system provides extended salt spray resistance if the topcoat is damaged.

Substitution of zinc chromate at levels of 10 g and 20 g in the above formulation produced comparable results.

If desired, other particulate materials may be added to the composition prior to mixing, i.e., graphite (5–10 microns), refractory metal oxides, refractory carbides, nitrides, silicides and borides.

EXAMPLE 6

A coating composition was prepared as follows:

A. Preparation of Binder.

| | |
|---|---|
| Magnesium dichromate hexahydrate | 348 g |
| Phosphoric acid | 98 g |
| Magnesium dihydrogen phosphate trihydrate | 292 g |
| Water to 1000 cc | |

The above-mentioned ingredients were mixed with rapid stirring.

B. Preparation of coating composition.

To the resulting binder of part A the following pigments were added.

| | |
|---|---|
| Alloy of 70% by weight aluminum and 30% magnesium - 325 mesh | 450 g |
| Aluminum powder, 5–10 μm atomized | 450 g |

Finally, 65 grams of strontium chromate was added with stirring. The composition was suitable for coating steel parts, based on the Brumbaugh patent (U.S. Pat. No. 3,869,293). With the strontium chromate addition, the coating retains its sacrificial nature but does not form white sacrificial by-products.

EXAMPLE 7

A primer coating composition was prepared as follows:

A. Preparation of Binder.

| | |
|---|---|
| Water (deionized) | 800 ml |
| Magnesium oxide | 10 g |
| Chromic acid | 57 g |
| Phosphoric acid | 100 ml |
| Fumed silica | 33 g |

The ingredients were admixed with stirring and diluted with water to 1 liter.

B. Preparation of Resin Dispersion.

| | |
|---|---|
| Water | 900 ml |
| Nonionic surfactant (Triton X-100) | 2.5 ml |
| Defoamer | 1 ml |
| Polyvinylidene fluoride (Kynar 301 F) | 150 g |

The ingredients were admixed with stirring to form a uniform dispersion.

C. Preparation of Primer.

| | |
|---|---|
| Binder of Part A | 500 ml |
| Dispersion of Part B | 500 ml |
| Strontium chromate | 15 g |

The binder of Part A was mixed with the dispersion of part B and then the strontium chromate was added.

The resulting primer was applied over freshly passivated hot dip galvanized stock, cured to a peak metal temperature of 500° F.

Good adherence was provided when a top coating of polyvinylidene fluoride was sprayed on and the laminate cured.

EXAMPLE 8

A coil coating primer composition for coil aluminum was prepared as follows:

A. Preparation of Binder.

| | |
|---|---|
| Water (deionized) | 600 ml |
| Magnesium oxide | 20 g |
| Chromic acid | 114 g |
| Phosphoric acid (85%) | 200 ml |
| Fumed silica (Aerosil 200) | 33 g |

The ingredients were admixed and diluted to 1 liter with deionized water to form the binder portion of the primer.

B. Preparation of Resin Dispersion.

| | |
|---|---|
| Water (deionized) | 900 ml |
| Polyvinylidene fluoride (Kynar 310 F) | 150 g |
| Nonionic surfactant (Igepal 630) | 2.5 ml |
| Defoamer (Troykyd 999) | 1.0 ml |

The ingredients were admixed and diluted with water to 1 liter.

The binder of Part A was mixed with the dispersion of Part B and then 30 g of zinc yellow was added to produce a primer coating composition. The composition when applied to a zinc diecasting substrate had a dried film thickness of 0.2–0.25 mil. After curing at 500° F. for 15 minutes it was topcoated with a polyvinylidene fluoride slurry topcoat and cured.

EXAMPLE 9

A coating composition of the invention of the type disclosed by Allen (U.S. Pat. No. 3,248,251) is prepared by mixing the following components:

| | |
|---|---|
| $MgCr_4.7H_2O$ | 266 g |
| $H_3PO_4$ | 98 g |
| $Mg(H_2PO_4)_2.3H_2O$ | 272 g |
| $H_2O$ to 1000 cc. Cool to room temperature | |
| Aluminum powder (spherical, 5–10μ | 600 g |

To the prepared composition was added 65 g of zinc chromate. The composition may be coated on ordinary steel stock (SAE 1010 steel) by spraying, drying at 80° F. and then curing at about 265° F. for 15 minutes. However, any other suitable substrate may be used in place of the steel, i.e., nickel, chromium, stainless steel, etc.

Similarly, there may be prepared a composition wherein magnesium chromate is replaced by any one of the following chromate-containing salts:

| | |
|---|---|
| Chromic acid | $H_2CrO_4$ or $CrO_3$ |
| Magnesium dichromate | $MgCr_2O_7$ |
| Zinc chromate | $ZnCrO_4$ |
| Zinc dichromate | $ZnCr_2O_7$ |
| Calcium dichromate | $CaCr_2O_7$ |
| Lithium dichromate | $Li_2Cr_2O_7$ |
| Magnesium dichromate plus sodium dichromate | |

These chromates/dichromates are dissolved during the binder manufacturing step.

EXAMPLE 10

Following the procedure of Example 9, a coating composition is prepared as follows.

| | |
|---|---|
| MgO | 7.25 g |
| Chromic acid | 9.2 g |
| Phosphoric acid (85%) | 22 ml |
| Water | 80 ml |

The ingredients are mixed and 0.78 grams of strontium chromate is added with mixing to form the coating composition.

Steel parts such as tool bits, screws, bolts, and fasteners are spray coated with the composition after suitable surface preparation. The coatings are dried in a drying cycle at 175° F. followed by a curing step at 650° F. for 30 minutes.

EXAMPLE 11

The following binder was made:
850 milliliters deionized water
22.3 grams magnesium oxide
135 grams phosphoric acid
53.9 grams chromic acid
The ingredients were mixed in the order given. After cooling the composition was made as follows:
850 milliliters of the above binder
405 grams aluminum powder, atomized spherical, 3.5 um equivalent spherical diameter
200 grams strontium chomate This composition was spray applied to degreased grit blasted 410 stainless steel turbine compressor blades.

After curing at 650° F. for 30 minutes the coating was reapplied and cured again. This coating system is suitable for application to turbine components operating in acid environment. The coating provides very satisfactory protection under highly corrosive conditions, such as in chemical plants or acid rain environment.

Three coats of the composition of this example were applied to steel specimens and each coat was thermally cured at 700° F. The cured coating was then sealed by application of a chromate/phosphate binder using the binder portion of Example 1. This composition was cured at 700° F. for 20 minutes.

EXAMPLE 12

The following binder was prepared:
241.5 grams deionized water
27 grams chromic acid
66 milliliters 85% phosphoric acid
The clear orange binder liquid was heated to 50° C. and 25 grams of Strontium chromate was added. The strontium chromate dissolved and the composition was cooled to 25° C. No precipitation occurred.

To 100 ml of the above binder 60 grams of Aluminum Atomized powder, 5 μm average particle size, and 20 grams of strontium chromate were added with stirring. This example shows the use of strontium chromate as part of the reacted dissolved binder chromate/ phosphate and also as undissolved inhibitor pigment.

U.S. Pat. No. 4,131,489 issued to Nelson J. Newhard Jr., which is incoporated herein by reference, discloses a composition for coating aluminum to improve corrosion resistance comprising chromium ions, phosphate ions and free fluoride ions. In contrast, the compositions of the invention normally do not contain free fluoride ions.

Although the present invention has been described with reference to the most preferred embodiments therein set forth, it is understood that the present disclosure has been made only by way of example and the numerous changes in the details of the compositions may be resorted to without departing from the spirit and scope of the invention. Thus, the scope of the invention should not be limited by the foregoing specification, but rather only by the scope of the claims appended hereto and the functional equivalents.

I claim:

1. A coating composition for a substrate metal part to be coated having improved salt spray resistance, which coating composition comprises an aqueous acid binder solution of dissolved phosphate ions, dissolved ions selected from the group consisting of chromate and molybdate ions, and, undissolved solid hexavalent chromium salt, said undissolved solid hexavalent chromium salt being in an amount which is in an excess of the amount which is soluble in the binder, and thereby is in an insoluble amount.

2. The coating composition of claim 1 wherein said sold undissolved hexavalent chromium salt selected from the group consisting of strontium chromate, zinc yellow, zinc tetroxy chromate, zinc potassium chromate and zinc chromate.

3. The coating composition of claim 1 including particulates of a member selected from the group consisting of fumed silica, fumed alumina and colloidal alumina.

4. The coating composition of claim 1 including in addition to the sold undissolved hexavalent chromium salt, metal particles.

5. The coating composition of claim 4 wherein said metal particles are aluminum.

6. The coating composition of claim 5 wherein the average equivalent spherical diameter of the particles is less than about 4 microns.

7. The counting composition of claim 5 wherein the ratio of aluminum particles to other solids is from about 1.5 to 1 to about 5 to 1 grams per liter of the solution in which it initially is dispersed.

8. The coating composition of claim 1 wherein the solution remains liquid due to the solid undissolved hexavalent chromium salt remaining as hexavalent chromium salt and not being reduced to a lower valency.

9. The coating composition of claim 1 wherein virtually all the solid undissolved chromium salt is in the hexavalent state.

10. The coating composition of claim 1 wherein the solid undissolved hexavalent chromium salt is unreacted with the acid binder solution.

11. The coating composition of claim 1 wherein the solid undissolved hexavalent chromium salt is dispersed in the solution.

12. The coating composition of claim 1 wherein the hexavalent, solid undissolved chromium salt is present in an amount in the range of 1 to about 20% by weight of the solids in the solution.

13. The coating composition of claim 1 wherein the hexavalent, solid undissolved chromium salt is present in an amount in the range of 1 to about 10% by weight of phosphate, chromate and/or molybdate solids in the solution.

14. The coating composition of claim 10 wherein the solution is free of oxidizable components that would reduce the solid undissolved hexavalent chromium salt to a lower valency chromium salt.

15. A coating composition for a substrate metal part to be coated and having improved salt spray resistance, which coating composition comprises an aqueous acid binder solution of dissolved phosphate ions, dissolved ions selected from the group consisting of chromate and molybdate ions and, dispersed in the solution, undissolved solid hexavalent chromium salt selected from the group consisting of strontium chromate, zinc yellow, zinc tetroxy chromate, zinc potassium chromate and zinc chromate, said undissolved solid hexavalent chromium salt being in such excess as to be insoluble.

16. The coating composition of claim 1 the undissolved solid hexavalent chromium salt is dispersed in the aqueous binder solution.

17. The coating composition of claim 1 wherein the minimum amount of solid hexavalent chromium salt is from about 1% by weight of the solids in the binder solution.

18. The coating composition of claim 1 wherein the amount of solid hexavalent chromium salt is in excess and is leachable out of the coating.

* * * * *

UNITED STATES PATENT AND TRADEMARK OFFICE
CERTIFICATE OF CORRECTION

PATENT NO. : 4,889,558
DATED : December 26, 1989
INVENTOR(S) : Mark F. Mosser

It is certified that error appears in the above-identified patent and that said Letters Patent is hereby corrected as shown below:

At column 16, line 46, delete "sold" and replace with --solid--.

At column 16, line 55, delete "sold" and replace with --solid--.

At column 16, line 62, delete "counting" and replace with --coating--.

Signed and Sealed this

Fifth Day of March, 1991

*Attest:*

HARRY F. MANBECK, JR.

*Attesting Officer*   *Commissioner of Patents and Trademarks*

UNITED STATES PATENT AND TRADEMARK OFFICE
CERTIFICATE OF CORRECTION

PATENT NO. : 4,889,558

DATED : December 26, 1989

INVENTOR(S) : Mark F. Mosser

It is certified that error appears in the above-identified patent and that said Letters Patent is hereby corrected as shown below:

At column 6, line 40, delete "cuing" and replace with --curing--.

At column 16, line 46, after "salt" insert --is--.

Signed and Sealed this

Twenty-eighth Day of May, 1991

Attest:

HARRY F. MANBECK, JR.

Attesting Officer

Commissioner of Patents and Trademarks